US006776488B2

(12) United States Patent
Burbulla

(10) Patent No.: US 6,776,488 B2
(45) Date of Patent: Aug. 17, 2004

(54) CAMERA CRANE

(76) Inventor: Horst Burbulla, An der Elisabethkirche 10, DE-53113 Bonn (DE)

( * ) Notice: Subject to any disclaimer, the term of this patent is extended or adjusted under 35 U.S.C. 154(b) by 0 days.

(21) Appl. No.: 10/254,029

(22) Filed: Sep. 24, 2002

(65) Prior Publication Data

US 2003/0076480 A1 Apr. 24, 2003

(30) Foreign Application Priority Data

Sep. 26, 2001 (DE) ........................................ 101 47 602

(51) Int. Cl.[7] ........................ G03B 21/00; G03B 17/00; F16M 11/00

(52) U.S. Cl. ..................... 352/243; 396/428; 248/123.2

(58) Field of Search ......................... 248/123.11, 123.2, 248/125.7; 396/419, 428; 352/243

(56) References Cited

U.S. PATENT DOCUMENTS 2,224,901 A 12/1940 Cunningham
2,719,471 A * 10/1955 Aspden et al. .............. 396/428
3,788,585 A 1/1974 Masseron
4,037,742 A 7/1977 Gustafsson
4,907,768 A * 3/1990 Masseron et al. ...... 248/123.11
4,943,019 A 7/1990 Mester
5,033,705 A * 7/1991 Reagan .................. 248/123.11
5,697,757 A * 12/1997 Lindsay ................... 414/744.6
5,855,344 A 1/1999 Rogers

FOREIGN PATENT DOCUMENTS

DE 1 843 389 12/1961
DE 38 15 342 C1 10/1989
WO WO 99/51911 10/1999

* cited by examiner

*Primary Examiner*—Russell Adams
*Assistant Examiner*—Arthur Smith
(74) *Attorney, Agent, or Firm*—Pauley Petersen & Erickson

(57) ABSTRACT

A camera crane having a carriage, a crane post which is arranged above the carriage, and a boom which is attached in such a manner that the boom can be tilted about a crane pivot axis, with sections of the boom extending on either side of the crane pivot axis. At an end of one section of the boom, a camera can be attached, and on the other section, a moment compensating counterweight can be attached. The section of the boom which carries the counterweight has a smaller length than the length of the crane post between carriage and crane pivot axis, and the boom has a pivot range about the crane pivot axis of more than 180°.

17 Claims, 5 Drawing Sheets

CAMERA CRANE

BACKGROUND OF THE INVENTION

1. Field of the Invention

This invention relates to a camera crane, having a moving carriage, a crane post arranged above the truck, and a boom which is attached to the crane post to pivot about a crane pivot axis, where the crane column has sections of the boom which extend on both sides of the crane pivot axis, wherein a camera is attached at an end of one section of the boom, and on the other section a moment-compensating counterweight is attached.

2. Discussion of Related Art

Camera cranes of the type described above are extensively used in motion picture and television productions and allow a suspended movement of movie or video cameras during filming. Camera cranes distinguished between so-called camera dollies, which allow the camera to be lifted only a short distance but which can be moved with a carriage on rails or freely on a support, thus allowing different movements of the camera, and larger camera cranes, which are usually located in a fixed position and have the ability to move the camera by a boom.

A camera crane is known from German Patent Reference DE 38 15 342 C1, but refinements can be made to this crane apparently only insofar as the possible movements of the camera attached to it are concerned. In particular, it is considered a drawback with known camera cranes, that the boom can only travel over a limited pivot range, which results in an undesirable restriction of the camera movements which can be achieved.

SUMMARY OF THE INVENTION

It is one object of this invention to provide an improved camera crane of the above mentioned type but which has a significantly increased range of movements of the camera attached to it.

To accomplish the object, one design of the camera crane according to this invention is discussed in the following specification and in the claims.

According to this invention, the object is accomplished with a section of the boom which carries the counterweight having a shorter length than the length of the crane post between the carriage and the crane pivot axis. The boom presents a range of inclination about the crane pivot axis of more than 180°. Thus, with the possible range of inclination of the boom about the crane pivot axis of more than 180°, which is achieved as a result of the shorter length of the section of the boom compared to the length of the crane post, a significantly increased ability to move the camera attached to the camera crane is achieved compared to known camera cranes. Thus a significant improvement in the possibilities of framing the picture with the camera crane is achieved according to this invention.

Known camera cranes present an angle of inclination of at most 120°, namely ±60° with respect to the horizontal. The camera crane according to this invention, in contrast, allows a much greater inclination of angle, for example, up to 300°.

Advantageously, the boom has on several parts several telescoping elements, which jointly form the section which is used for the attachment of the camera, so that the length of the section can be changed. Thus, the camera attached to the boom can be raised to a great height by extending the telescoping elements in the vertical arrangement of the boom, or in the case of a horizontal orientation of the boom, it also allows movements over long distances, so that the camera dollies which for these purposes were required in the past can be effectively replaced. Because the change in the length of the boom, which is achieved with the telescoping elements that can be moved in or out, occurs exclusively in the area of the section which is used for the attachment of the camera. The shorter length according to this invention of the other section of the boom compared to the length of the crane post is maintained between the carriage and the crane pivot axis. Thus, independently of the changing length of the section used for the crane attachment, a range of inclination of the boom on the crane pivot axis of more than 180° can be maintained.

The moment-compensating counterweight is preferably arranged so that it can be slid on the section of the boom so that, in accordance with the weight of a given attached camera, an adjustment can be made, and it is also possible to adjust the length, which can be changed by the telescoping elements, of the section which is used for the attachment of the camera. In this case, the position of the counterweight is preferably adjusted during the extension of the telescoping elements of the boom, where the adjustment occurs in the opposite direction and is proportional on the section of the boom assigned to it, to compensate for moments.

For the attachment of the camera to the boom, an attachment platform for the camera is provided, which can be pivoted over a horizontal axis as well as over a vertical camera tilt axis, in order to account for the high range of inclination of the boom about the crane pivot axis, which is achieved according to this invention.

It is preferred to have a measuring device to measure the inclination of the boom about the camera tilt axle, for example appropriate displacement sensors. The tilting of the attachment platform about the horizontal axis is continuously readjusted according to the measured inclination of the boom about the camera tilt axis. It is thus possible to ensure a horizontal orientation of the camera within the attachment platform independently of the inclination of the boom. Naturally, other inclinations of the attachment platform can also be permanently maintained besides the horizontal orientation.

In another embodiment of this invention, the crane post is rotatably attached to move about the vertical axis of rotation with respect to the carriage in order to allow corresponding rotation of the camera about the vertical axis of rotation.

To facilitate the transport of the camera crane according to this invention, the boom is preferably attached to the crane post in a removable manner, which can be achieved by attaching the boom to the side of the crane post, as explained in greater detail below.

Other movement possibilities of the camera which is secured to the camera crane according to this invention are possible because the camera itself is held by a pivot head to the attachment platform, whereby the camera can be moved about a horizontal camera tilt axis as well as a camera roll axis which runs in the viewing direction of the camera. While the horizontal axis of the attachment platform is preferably used to ensure the horizontal orientation of the attachment platform independently of the inclination of the boom, the inclination of the pivot head about the camera tilt axis also allows a change in the orientation of the camera about the camera tilt axis, independently of the position of the camera crane.

In one embodiment of the camera crane according to this invention, it is possible for all the movements of the boom, the crane post, the attachment platform and/or the pivot head to be effected by electric motors, and there is a control device for the electric motors. The electric motors themselves can advantageously be designed to be directly driven, where only magnets and corresponding coils are attached to the components which move relative to each other, and adjustment is achieved, which is free of play and has high positioning precision.

The control device of the camera crane according to this invention can advantageously comprise a data storage device to store several positions of the camera crane and a processor, by which the movements of the camera crane between successive positions can be calculated and subsequently automatically carried out. Thus, one or more automated shooting sequences can be carried out by the camera crane according to this invention.

For this purpose, the desired camera positions are manually adjusted, and stored in the data storage of the control device. By corresponding measurement recording devices, the camera position which was achieved in the process is unequivocally recorded, because the rotation of the crane post about the vertical axis of rotation, the inclination of the boom about the crane tilt axis, the position of the telescoping elements of the boom, the inclination of the pivot head about the camera tilt axis as well as about the camera roll axis, and the rotation of the attachment platform about the vertical camera tilt axis are precisely measured in degrees and stored. With a known calculation function, for example, the spline function, the processor then calculates the movement paths of the camera crane which are required between two such positions stored in the data storage device, about the given axes, so that subsequently an automatic passage through this path between the individual stored positions is possible, and can be carried out with extremely high precision of reproduction.

To control the desired positions during the manual movement, it is possible, for example, to provide a control console which is positioned at a distance from the camera crane, and is equipped with monitors and elements for controlling the different drive instructions to the camera crane.

BRIEF DESCRIPTION OF THE DRAWINGS

Embodiments of the camera crane according to this invention are explained in view of the drawings, wherein.

DESCRIPTION OF PREFERRED EMBODIMENTS

Figure 1:
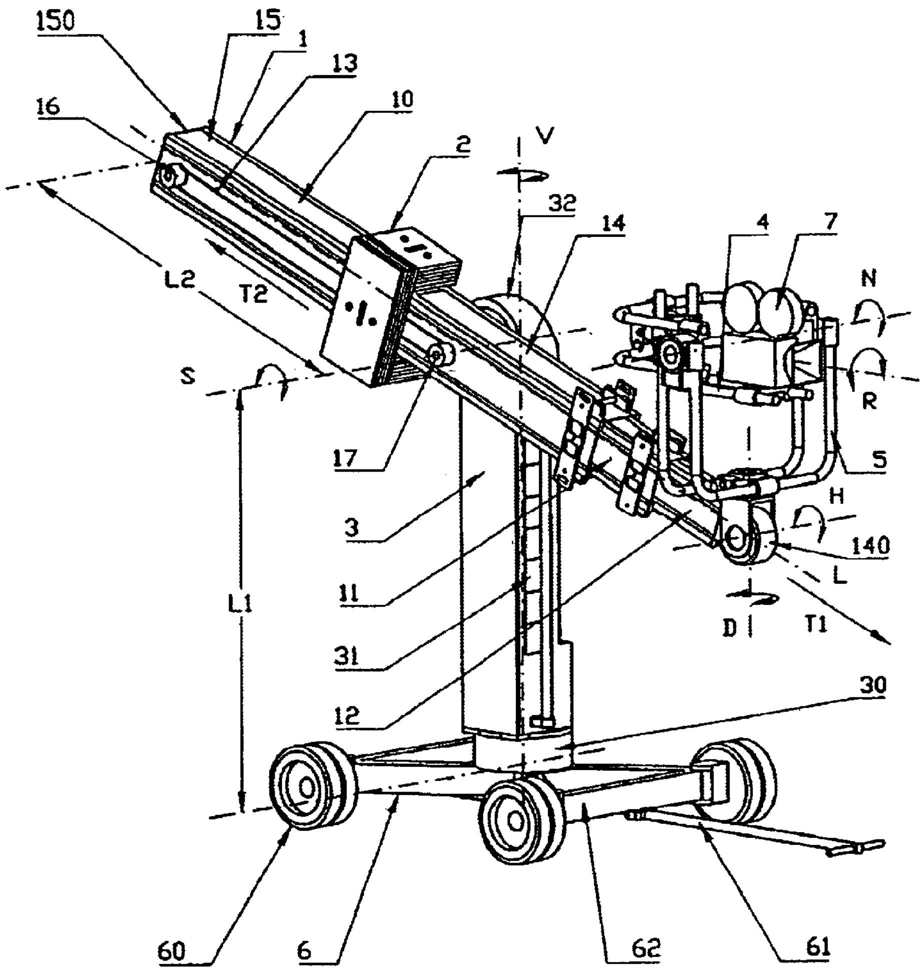
FIG. 1 shows a perspective view of a camera crane according to this invention, in a first position.

FIG. 1 is a perspective view of a camera carriage which is used for the attachment and movement of a camera 7, for example, a film camera.

The camera crane comprises a carriage 6 with frame 62, a steering column 61 as well as several track wheels 60, by which the camera crane can be moved on a support. A camera column 3 that extends vertically and that rotates about vertical axis of rotation V by a pivot bearing 30 with direct drive electric motor on the carriage 6 is arranged on the top side of the carriage 6.

A boom 1 is attached to the side of the top end of the camera column 3 so that it can be tilted about crane axis S which extends horizontally with respect to the camera column 3. The camera column 3 for this purpose presents, at its top end, a crane bearing 32 with a directly driven electric motor, not shown in detail, for moving the boom 1 about the crane axis S in the direction indicated by the arrows. Also, the connection between the boom 1 and the crane column 3 is such that it can be decoupled by means of coupling elements, not shown, so that the boom 1 can be removed from the camera column 3 to facilitate the transport of the camera crane.

Figure 4:
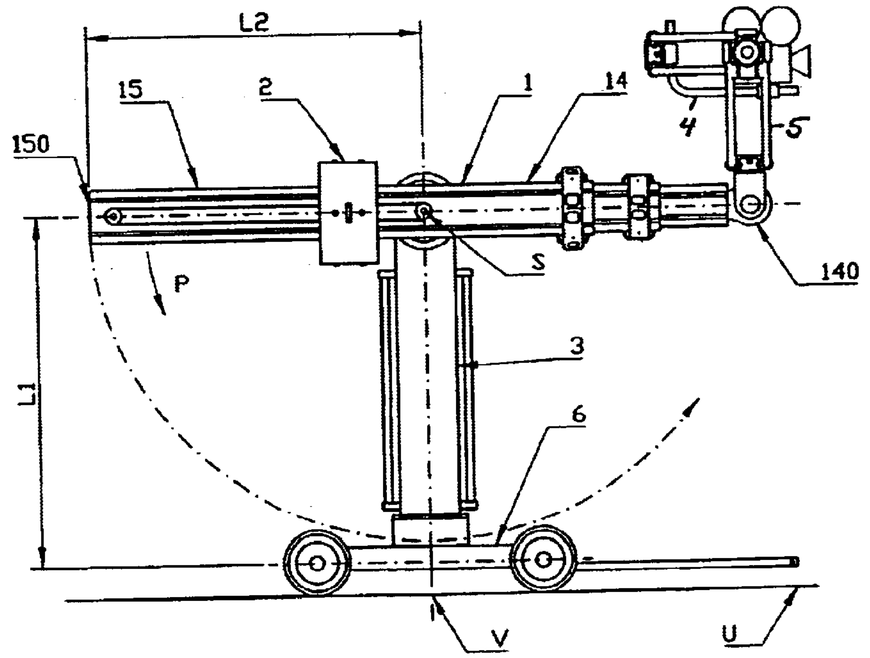
FIG. 4 shows a side view of the camera crane according to this invention.

As shown in further detail and also in the drawing according to FIG. 4, the boom 1 comprises two sections that extend on either side of the horizontal crane pivot axis S, which are designated by the reference numerals 14 and 15.

Here the section 14 attaches to the camera 7, and for this purpose the camera 7 is attached by a pivot head 4, which is described in greater detail below, as well as by the attachment platform 5 at the end 140 of the section 14. The opposite section 15 receives the moment-compensating counterweight 2.

An essential characteristic of the camera crane is that the section 15 of the boom 1 which carries the counterweight 2 has a length L2 which is limited by the crane pivot axis S and its end 150, which length is less than the length L1 of the crane post 3 between the carriage and the crane pivot axis S.

Thus, it is possible to tilt the boom 1 as shown in FIG. 4 over a range of inclination with respect to the crane pivot axis S that is considerably greater than 180°. As shown, for example in FIG. 4, the boom 1 can be tilted with respect to the horizontal in the direction of the arrow P, so that the end 140 of the opposite section 14, which attaches the camera 7, is raised. Also, the section 15 of the boom can be pivoted parallel to the crane post 3, without any collision of the end 150 at the carriage 6 or the support U, so that the available movement on the camera inclination axis can be considerably increased. Thus, the boom 1 can even be moved beyond the vertical so that the camera 7 starts to be lowered again. With the corresponding structure design of the camera crane, it is possible to allow unlimited inclination of the boom 1 about the crane pivot axis S, or at least it becomes possible to approach and reach an inclination of approximately 300°, for example.

As shown in FIG. 1, to provide additional movement possibilities for the camera 7 attached to the camera crane, the boom 1 is designed as a telescoping boom with several, in this case three, telescoping elements 10, 11, 12, which can be moved out in the direction of the longitudinal axis L of the boom 1 along the direction of the arrow T1, or moved in the opposite direction. The additional telescoping elements 11, 12, which are located inside the telescoping element 10, during the outward movement in the direction T1 or the inward movement in the opposite direction, merely change the length of the section 14 of the boom 1, which is used for the attachment of the camera, without changing the length of the segment 15. Thus, the increased possible range of inclination of the boom 1, as explained above, is maintained due to the shorter length L2 of the section 15 compared to the length L1 of the crane post 3.

The telescoping movements of the telescoping elements 10, 11, 12 in the direction of T1 or in the opposite direction are here preferably effected by an electric motor which is arranged in the boom 1, for example, close to the end 150, where the electric motor acts by cables on the additional telescoping elements 11, 12.

To compensate for the moments that occur, the counterweight 2 which is attached to the section 15, is adjusted by a cable 13, which runs between the deflection rollers 16 and 17, synchronously and proportionally in the opposite direction, so that, independently of the position of deployment of the telescoping elements 11, 12, moment compensation is always ensured in the boom 1. This principle is generally known, for example in connection with elevators, so that the motor which drives the telescoping elements 11, 12 must only overcome the existing frictional forces, for example, when the telescoping elements 11, 12 are moved out in the direction of the arrow T1, and the counterweight 2 is shifted in the direction of the arrow T2 in the opposite direction.

In order to ensure a heavy weight for the counterweight 2 while saving as much space as possible, the weight is designed in the form of a U, and straddles the section 15. As shown, for example in FIG. 2, it can be constructed in such a way that each of its side pieces 20, 21, 22 has individual plates that can be added or removed, so that the weight of the counterweight 2 can be easily adjusted.

As mentioned, at the end 140 of the section 14, an attachment platform 5 is arranged, which has the form of two parallel U-shaped frame elements 50 which are at an angle.

The attachment platform 5 can be tilted, in the area of connection to the end 140 of the section 14 of the boom 1, about a horizontal axis H, where in the area of the end 140 there is a horizontal pivot bearing which can be moved by a directly driven electric motor.

Furthermore, the attachment platform 5 can also be tilted by a pivot drive 51 about a vertical camera pivot axis D.

Finally, in the area of the U arm ends 52 of the attachment platform 5, there is a pivot head 4 which carries the camera 7. The camera pivot head 4, by pivot bearings 41, directly driven by an electric motor, allows the tilting of the camera 7 on a horizontal camera tilt axis N and with an additional direct drive, not shown, it also allows a rolling motion of the camera 7 in its viewing direction on a roll axis R.

Figure 2:
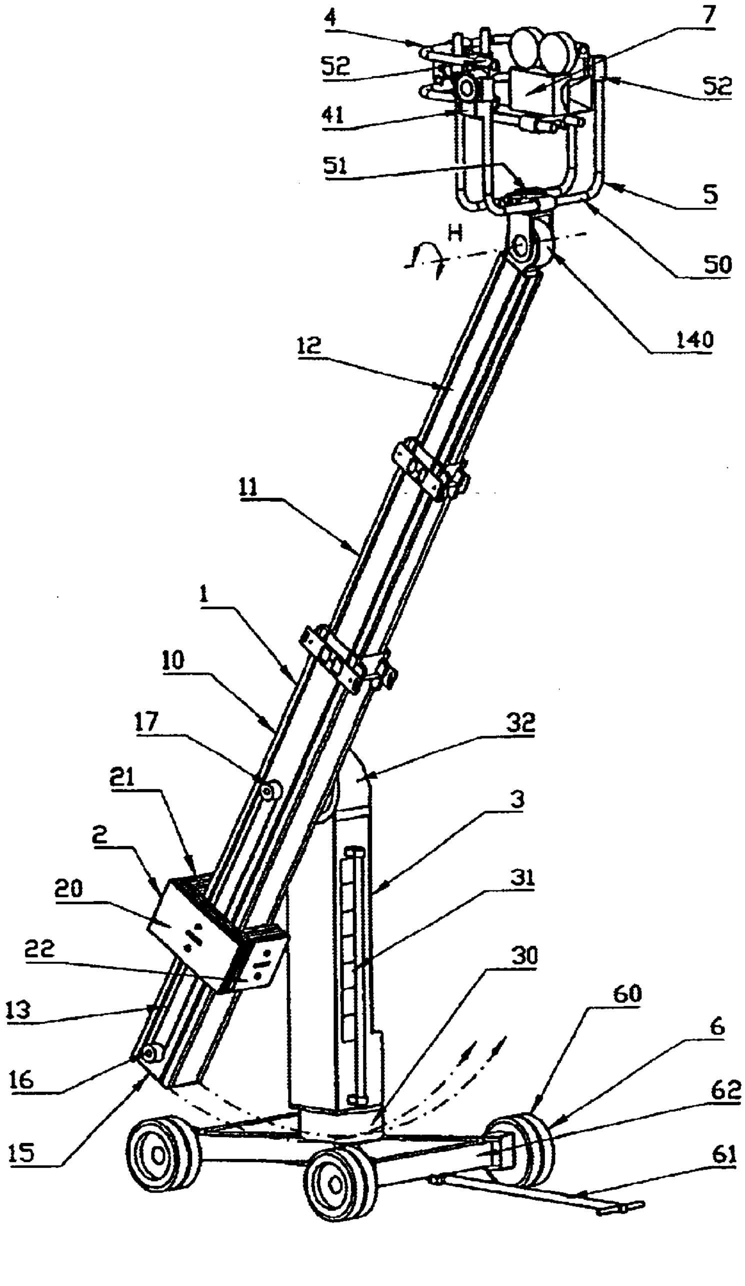
FIG. 2 shows a perspective view of the camera crane according to FIG. 1, in another position.
Figure 3:
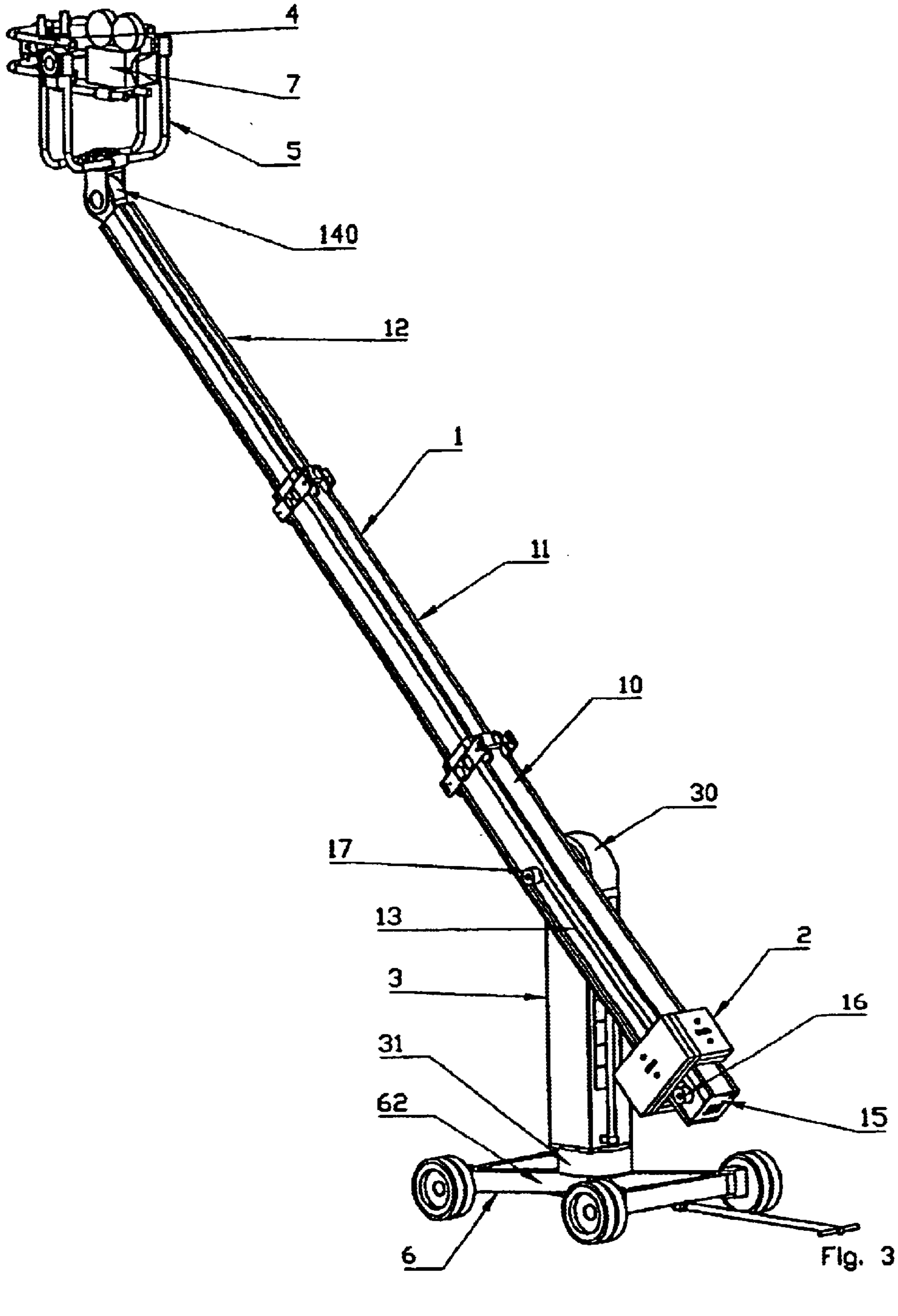
FIG. 3 shows a perspective view of the camera crane according to FIG. 1, in another position.

As apparent from the comparative representations of different positions of the camera crane according to FIGS. 1, 2 and 3, the purpose of the attachment platform 5 with its ability to tilt about the horizontal axis H is to ensure a permanently horizontal orientation of the attachment platform 5 for the camera 7, independently of the tilting of the boom 1 about the crane tilt axis S. For this purpose, at the crane pivot bearing 32 of the crane post 3, corresponding measurement installations are provided for the continuous determination of the tilting of the boom 1, and the attachment platform 5 can be moved by the tilt drive provided in the area of end 140 in accordance with the measured tilt of the boom 1 about the crane tilt axis S, with compensation about the horizontal axis H, so that a permanently horizontal orientation as shown in FIG. 1 is maintained, where the U arm ends 52 of the attachment platform 5 point vertically upward. Additional camera angles can then be set via the camera tilt axis N inside the pivot head 4.

Figure 5:
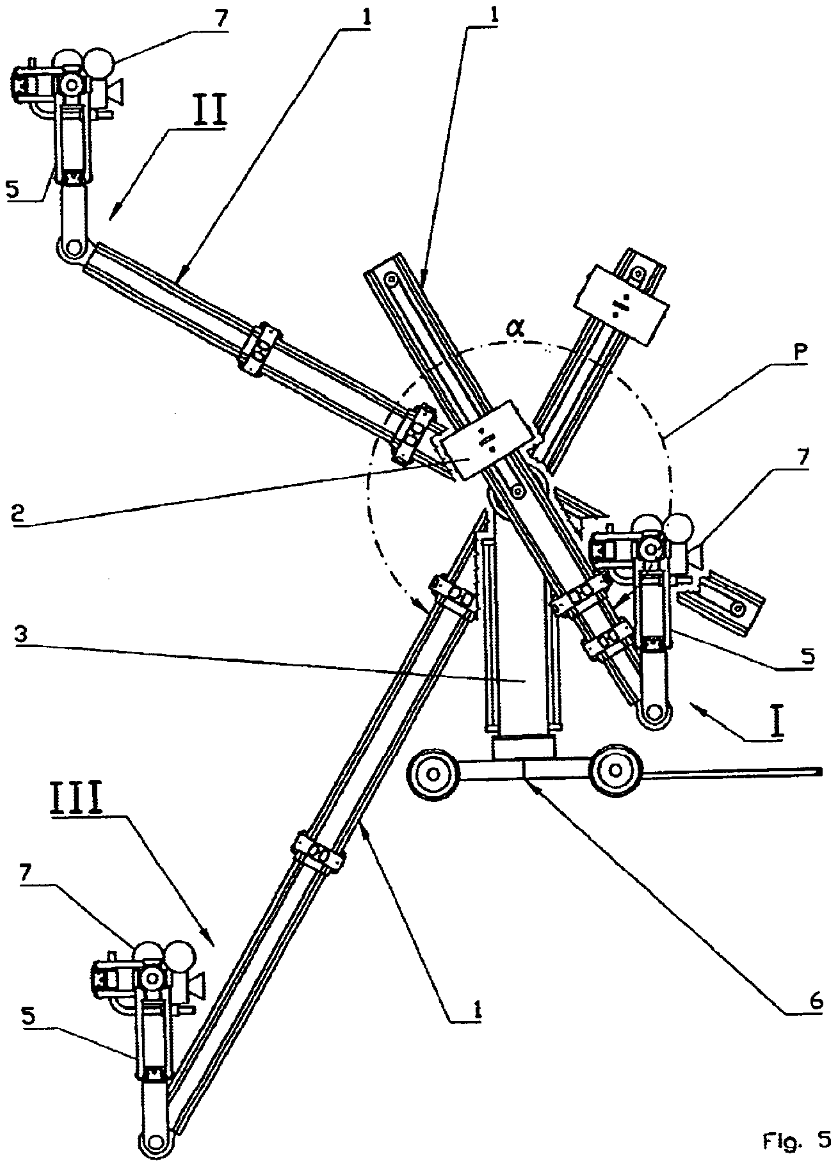
FIG. 5 shows a schematic side view of movement possibilities of the camera crane according to this invention.

For explanatory purposes, FIG. 5 schematically shows, using three different positions of the camera crane, identified as positions I, II and III, that, independently of the pivoting of the boom 1, the camera 7 can always maintain a horizontal orientation due to the independent control of the attachment platform 5.

Furthermore, as shown in FIG. 5, the preferred maximum pivot range of the boom 1 is denoted by $\alpha$ and corresponds to a pivot angle of 300°.

From the comparative consideration of the different positions of the camera crane according to FIGS. 1–3, as well as 5, one can also see the moment compensating counter movement of the counterweight 2 with respect to the telescoping elements 10, 11, 12 of the boom 1. As shown in FIG. 1, the telescoping elements 11, 12 are almost completely retracted into the telescoping element 10, and the counterweight 2 is close to the camera tilt axis S and the deflection roller 17 on the section 15 of the boom 1.

In contrast, in the representation shown in FIG. 2, there is a partially extended view of the telescoping elements 11, 12 from the telescope element 10, where the counterweight 2 is located approximately in the middle of the section 15 between the two deflection rollers 16, 17.

Finally, FIG. 3 shows a position of the camera crane in which the telescoping elements 11, 12 are completely extended from the telescope element 10, and the counterweight 2 is shifted in its outermost position on the section 15 close to the deflection roller 16.

Each telescope element can present, for example, a length of approximately 2.5 m, where, in spite of the small structural size of the camera crane, a lens height of the camera 7 of at least 6 m can thus be achieved.

An additional essential characteristic of the camera crane represented in the figures is that all movements about the above-indicated axes S, V, H, N, R and D as well as those of the boom in the direction of the arrow T1 or in the opposite direction can be achieved by electric motors and monitored by corresponding displacement sensors. The control of each of the motors is taken over by a control device, the components of which can be arranged inside reception spaces 31 within the crane post 3, and which, besides evaluating the control signals to the individual electric motors, also evaluates the data from each path recorder.

Moreover, the control device can advantageously present a data storage device for storing different positions, which are manually established beforehand, for example, the positions shown in FIGS. 1–3, where a processor which also belongs to the control device can determine the process paths located between the positions and the necessary movements by a spline function, so that the control device can then search for individual movements and positions in an automated manner.

In this manner, automated movements, for example, camera pivot motions previously stored can be reproduced with the highest possible precision.

The generation of automatic movement paths from positions which are individually and manually established is in principle known, for example, from robotic controls in manufacturing processes, and can be applied here analogously.

German Patent Reference 101 47 602.7, the priority document corresponding to this invention, and its teachings are incorporated, by reference, into this specification.

What is claimed is:

1. A camera crane comprising a carriage (6), a crane post (3) arranged above the carriage (6) and attached to a boom (1) so that the boom can be tilted about a crane pivot axis (S) of the crane post (3) with sections (14, 15) of the boom (1) which extend on either side of the crane pivot axis (S), wherein at an end (140) of a first section (14) of the sections (14, 15) of the boom (1) a camera (7) is attachable and on a second section (15) of the sections (14, 15) a moment-compensating counterweight (2) is attachable, the second section (15) of the boom (1) which carries the counterweight (2) having a second length (L2) which is less than a first length (L1) of the crane post (3) between the carriage (6) and the crane pivot axis (S), the boom having a pivot range about the crane pivot axis (S) of more than 180°, the boom (1) including several telescoping elements (10, 11, 12) forming the first section (14) so that an overall length of the first section (14) is changeable, and wherein the crane post (3) is rotatable about a vertical axis of rotation (V) on the carriage (6).

2. The camera crane according to claim 1, wherein the counterweight (2) is slideable on the second section (15) of the boom (1).

3. The camera crane according to claim 2, wherein with the telescoping elements (10, 11, 12) of the boom (1) extended the counterweight (2) is adjustable in an opposite direction on the second section (15) and proportionally to compensate for moments.

4. The camera crane according to claim 3, wherein at the end (140) of the first section (14) of the boom (1) an attachment platform (5) for the camera (7), which can be pivoted, is attachable where the camera (7) is pivoted about a horizontal axis (H) and about a vertical camera pivoted axis (D).

5. The camera crane according to claim 4, further comprising a measuring device for measuring a degree of tilt of the boom (1) about the crane pivot axis (S), and a second degree of tilt of the attachment platform (5) about the horizontal axis (H) is continuously readjustable as a function of a measured tilt of the boom (1) about the crane pivot axis (S).

6. The camera crane according to claim 4, wherein the camera (7) is held by a pivot head (4) to the attachment platform (5), and with the pivot head (4) the camera (7) is moveable about a horizontal camera tilt axis (N) and a camera rolling axis (R) which runs in a viewing direction of the camera (7).

7. The camera crane according to claim 5, wherein the boom (1) is detachably attached to the crane post (3).

8. The camera crane according to claim 7, wherein the camera (7) is held by a pivot head (4) to the attachment platform (5), and with the pivot head (4) the camera (7) is moveable about a horizontal camera tilt axis (N) and a camera rolling axis (R) which runs in a viewing direction of the camera (7).

9. The camera crane according to claim 8, wherein movements of at least one of the boom (1), the crane post (3), the attachment platform (5) and the pivot head (4) is moveable by electric motors controlled by a control device.

10. The camera crane according to claim 9, wherein the control device comprises a data storage device for storing several positions of the camera crane, a processor by which movements of the camera crane between successive positions which are stored in the data storage device are calculated and then executed automatically by the control device.

11. The camera crane according to claim 1, wherein the counterweight (2) is slideable on the second section (15) of the boom (1).

12. The camera crane according to claim 11, wherein with a plurality of telescoping elements (10, 11, 12) of the boom (1) extended, the counterweight (2) is adjustable in an opposite direction on the second section (15) and proportionally to compensate for moments.

13. The camera crane according to claim 1, wherein at the end (140) of the first section (14) of the boom (1) an attachment platform (5) for the camera (7), which can be pivoted, is attachable where the camera (7) is pivoted about a horizontal axis (H) and about a vertical camera pivoted axis (D).

14. The camera crane according to claim 13, further comprising a measuring device for measuring a degree of tilt of the boom (1) about the crane pivot axis (S), and a second degree of tilt of the attachment platform (5) about the horizontal axis (H) is continuously readjustable as a function of a measured tilt of the boom (1) about the crane pivot axis (S).

15. The camera crane according to claim 1, wherein the boom (1) is detachably attached to the crane post (3).

16. The camera crane according to claim 1, wherein movements of at least one of the boom (1), the crane post (3), an attachment platform (5) and a pivot head (4) is moveable by electric motors controlled by a control device.

17. The camera crane according to claim 16, wherein the control device comprises a data storage device for storing several positions of the camera crane, a processor by which movements of the camera crane between successive positions which are stored in the data storage device are calculated and then executed automatically by the control device.

* * * * *